A. FIKE.
COMBINED DISH PAN AND DRAIN.
APPLICATION FILED DEC. 28, 1908.
917,278.
Patented Apr. 6, 1909.
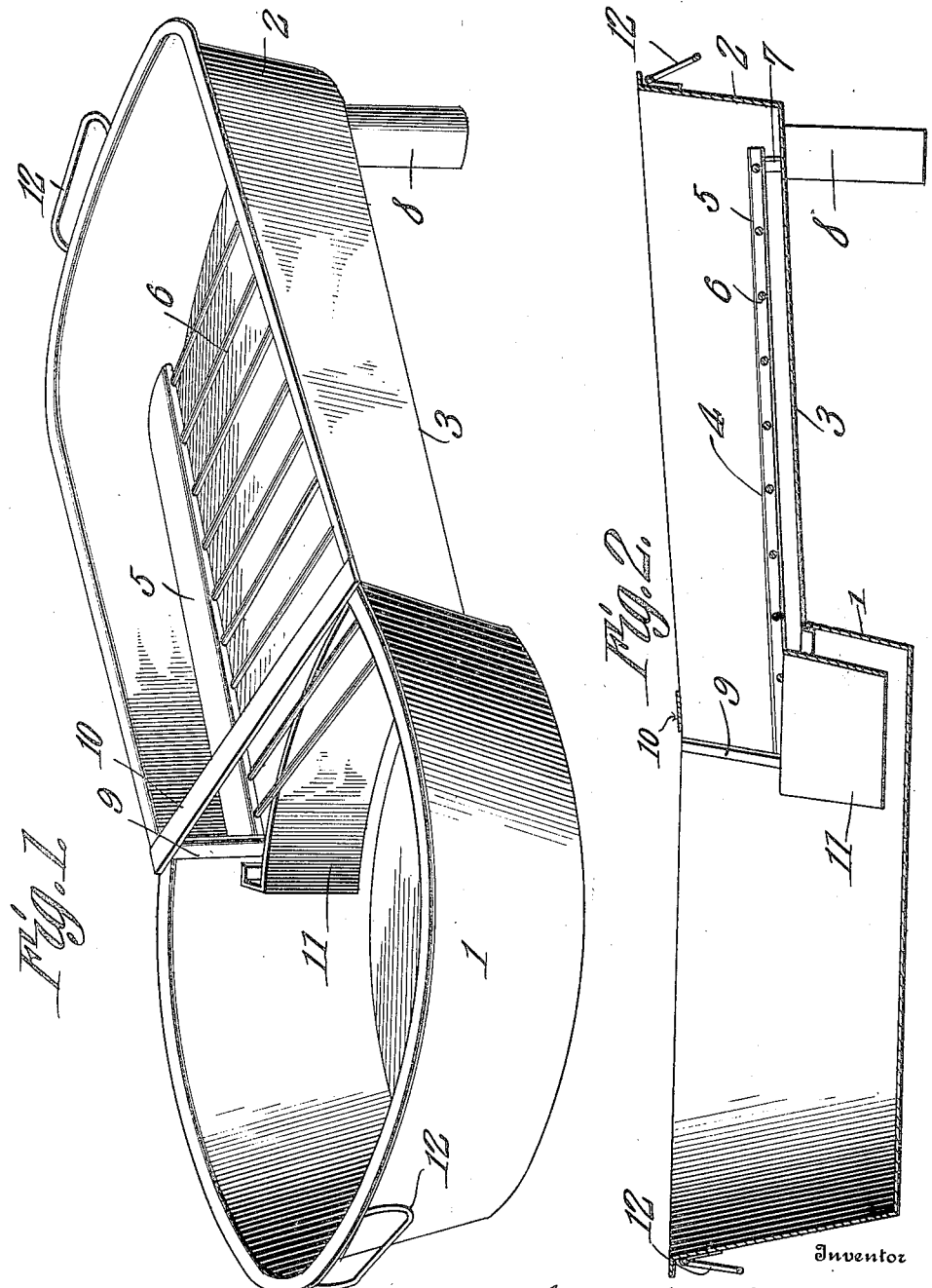

UNITED STATES PATENT OFFICE.

AMMI FIKE, OF NEWTON, KANSAS.

COMBINED DISH-PAN AND DRAIN.

No. 917,278.  Specification of Letters Patent.  Patented April 6, 1909.

Application filed December 28, 1908. Serial No. 469,551.

*To all whom it may concern:*

Be it known that I, AMMI FIKE, a citizen of the United States, residing at Newton, in the county of Harvey and State of Kansas, have invented a new and useful Combined Dish-Pan and Drain, of which the following is a specification.

The objects of the invention are, generally, the provision, in a merchantable form, of a device of the above mentioned class, which shall be inexpensive to manufacture, facile in operation, and devoid of complicated parts; specifically, the provision of a washing pan, draining trough, draining rack, baffle plate, and rest bar of novel and improved construction, and the assembling of these several elements to form an efficient and compact device; other and further objects being made manifest hereinafter as the description of the invention progresses.

The invention consists in the novel construction and arrangement of parts, hereinafter described, delineated in the accompanying drawings, and particularly pointed out in the appended claims, it being understood that divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings:—Figure 1 shows my invention in perspective; Fig. 2 is a vertical longitudinal section thereof.

In carrying out my invention I provide a washing pan 1 which may be of any form, preferably, however, as shown, it is of the common circular type. I further provide a draining trough 2 extending from the washing pan and arranged to discharge thereinto, the wall of the washing pan being entirely cut away within the contour of the draining trough. The draining trough 2 has an inclined bottom 3 to discharge the drip into the washing pan 1, and in order to maintain the equilibrium of the device, legs 8 depend from the draining trough 2 near that terminal thereof which is remote from the point of attachment between the draining trough and the washing pan. I further provide a draining rack denoted generally by the numeral 4 in Fig. 2, and comprising side members 5 united preferably by slats 6, the side members 5 being disposed longitudinally of the draining trough 2 and in close relation to its side walls, and the slats 6 being disposed transversely of the said draining trough, the rack being spaced from the inclined bottom 3 of the draining trough by legs 7 depending from the side members 5. In order to prevent the draining rack 4 from sliding down the inclined bottom 5 of the trough into the washing pan 1, shoulders 9 are caused to project inward from the side walls of the draining trough to receive, in abutting relation, the terminals of the side members 5 of the draining rack. Mounted upon the upper edges of the draining trough 2, near to the point of union between the draining trough and the washing pan is a straight rest-bar 10.

If desired, the device may be equipped with a baffle plate 11 inwardly spaced from the wall of the washing pan and terminally mounted thereon. This baffle plate 11 is caused to extend upward slightly above the inclined bottom 3 of the draining trough and is carried downward to a point near the bottom of the washing pan 1. In mounting this baffle plate 11 upon the wall of the washing pan, I space it from the said wall sufficiently that a rag or brush may readily be introduced, for cleansing purposes, between the said baffle plate and the wall of the washing pan, upon which it is mounted.

In order to facilitate the moving of the device, I mount upon its remote terminals handles 12, which may be of any form.

I regard it as of importance that the walls of the washing pan 1 are entirely cut away within the contour of the draining trough 2, since by this construction the device may be readily cleaned. It has been the common practice, so far as I am advised as to the state of the art, to allow a portion of the wall of the washing pan to remain intact between the side walls of the draining trough 2 to form a member upon which the dishes in the draining trough might be rested. This practice is fraught with the disadvantage already mentioned, namely, that it renders the device difficult to clean, and with the further disadvantage that when the dishes rest upon this portion of the wall of the washing pan, the same being curved, the dishes tend to follow its curved periphery, ultimately abutting against the side walls of the draining trough, in which position they extend beyond the walls of the device, the wash water with which they were coated dripping outside the contour of the device and falling upon the table upon which it is supported, rendering the same filthy and unpleasant. To remedy this difficulty I have provided the straight rest-bar 10, and it will be seen that when the inclined dishes which are in the draining trough 2 are in contact with the member 10, there will be no component tending to force them to the sides of the device and into projection beyond its contour.

When the draining rack 4 is mounted in the draining trough 2, it is retained in position by the shoulders 9, and since the slats 6 are disposed transversely of the draining trough 2, the lower terminals of the dishes engaging these transversely disposed slats 6 will be held securely, their upper terminals being supported by the rest-bar 10.

In carrying out my invention, I sometimes give the washing pan 1 a considerable depth, and with this construction, there is often a marked difference in temperature between the water which is at the top of the pan and the water which is at the bottom thereof. Any wash water which may drip from the dishes in the draining trough 2 will fall upon the inclined bottom 3, and following the same will be discharged into the washing pan 1. Now this drip water from the dishes is commonly at a much lower temperature than the wash water in the pan 1 and if it were allowed to flow unimpeded from the draining trough 2 into the washing pan 1, it would normally mingle with the warm water which is at the top of the pan. By causing the baffle plate 11 to extend upward above the inclined bottom 3 of the draining trough, I provide a means to receive this cold drip water and to conduct it to the bottom of the washing pan 1, where its chilling effect will be least perceptible.

When the dishes, having been washed, are mounted in the draining trough 2, as hereinbefore described, it is the common practice to pour over them hot water to rinse them, and the hotter this rinsing water may be the more effective is the rinsing. While the operator is engaged in washing the dishes in the washing pan 1, another person is frequently called upon to rinse the dishes in the draining trough with hot water, and this hot water, often at a boiling point, following the inclination of the bottom 3 of the draining trough is projected upon the hands of the person who is washing the dishes, not infrequently resulting in serious injury. When, however, a baffle plate of the type shown is provided, this hot water, impinging against the upper terminal of the baffle plate, will be carried downward to the bottom of the pan, all danger of scalding being thereby avoided.

Having thus described my invention, what I claim as new, and desire to protect by Letters Patent is:—

1. In a device of the class described, a washing pan; a draining trough extending from the washing pan and arranged to discharge thereinto; and a baffle plate carried by the washing pan and upwardly extended beyond the bottom of the draining trough.

2. In a device of the class described, a washing pan; a draining trough extending from the washing pan and arranged to discharge into the washing pan, the walls of the washing pan being entirely cut away within the contour of the draining trough; shoulders projecting inward from the side walls of the draining trough; and a draining rack mounted in the trough and arranged to abut against the shoulders.

In testimony that I claim the foregoing as my own, I have hereto affixed my signature in the presence of two witnesses.

AMMI FIKE.

Witnesses:
  E. D. ROOT,
  R. L. BARNHISEL.